US009882455B2

(12) United States Patent
Danov et al.

(10) Patent No.: US 9,882,455 B2
(45) Date of Patent: Jan. 30, 2018

(54) COOLING SYSTEM FOR ELECTRIC GENERATORS

(71) Applicant: Siemens Aktiengesellschaft, Munich (DE)

(72) Inventors: Vladimir Danov, Erlangen (DE); Bernd Gromoll, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 14/441,841

(22) PCT Filed: Oct. 24, 2013

(86) PCT No.: PCT/EP2013/072240
§ 371 (c)(1),
(2) Date: May 9, 2015

(87) PCT Pub. No.: WO2014/072181
PCT Pub. Date: May 15, 2014

(65) Prior Publication Data
US 2015/0288252 A1 Oct. 8, 2015

(30) Foreign Application Priority Data
Nov. 12, 2012 (DE) .......... 10 2012 220 559

(51) Int. Cl.
*H02K 9/20* (2006.01)
*H02K 3/24* (2006.01)
*H02K 1/32* (2006.01)
*H02K 1/20* (2006.01)
(Continued)

(52) U.S. Cl.
CPC ............. *H02K 9/005* (2013.01); *F25B 27/02* (2013.01); *F25B 30/02* (2013.01); *F25B 41/00* (2013.01);
(Continued)

(58) Field of Classification Search
CPC .... H02K 1/20; H02K 1/32; H02K 9/00–9/28; H02K 5/20; H02K 3/24
(Continued)

(56) References Cited

U.S. PATENT DOCUMENTS 2,561,737 A 7/1951 Hill
3,866,438 A 2/1975 Endress
(Continued)

FOREIGN PATENT DOCUMENTS

CN 1068726 C 7/2001
CN 101630880 A 1/2010
(Continued)

OTHER PUBLICATIONS

Duct. (n.d.) American Heritage® Dictionary of the English Language, Fifth Edition. (2011). Retrieved Jan. 14 2017 from http://www.thefreedictionary.com/duct.*
(Continued)

*Primary Examiner* — Thomas Truong
(74) *Attorney, Agent, or Firm* — Beusse Wolter Sanks & Maire

(57) ABSTRACT

An electric generator, in particular a power station generator is provided, having at least one inlet and an outlet for at least one hollow conduit for receiving a coolant fluid. The hollow conduit is situated in or on a rotor and/or a stator/stator bars and/or a shaft and/or a housing of the electric generator wherein the hollow conduit is set up as an evaporator for receiving thermal energy from the electric generator via the coolant fluid. The cooling process allows the efficiency of the electric generator to be increased.

7 Claims, 2 Drawing Sheets

(51) Int. Cl.
*H02K 9/00* (2006.01)
*F25B 27/02* (2006.01)
*F25B 30/02* (2006.01)
*F25B 41/00* (2006.01)

(52) U.S. Cl.
CPC ............... *H02K 1/20* (2013.01); *H02K 1/32* (2013.01); *H02K 3/24* (2013.01); *H02K 9/20* (2013.01); *F25B 2341/0014* (2013.01)

(58) Field of Classification Search
USPC .......................................... 310/52, 54, 58, 59
See application file for complete search history.

(56) References Cited

U.S. PATENT DOCUMENTS

| | | | |
|---|---|---|---|
| 4,227,905 A | 10/1980 | Burger et al. | |
| 6,086,333 A * | 7/2000 | Krutzfeldt | H02K 9/24 277/432 |
| 8,516,850 B2 | 8/2013 | Jadric et al. | |
| 2007/0144186 A1* | 6/2007 | Shiflett | C09K 5/047 62/112 |
| 2008/0098768 A1* | 5/2008 | Masoudipour | F25B 31/006 62/505 |
| 2011/0110796 A1 | 5/2011 | Danov et al. | |
| 2011/0113809 A1* | 5/2011 | Adaniya | B60K 1/00 62/324.6 |
| 2012/0049665 A1* | 3/2012 | Garriga | H02K 5/20 310/54 |
| 2013/0038151 A1* | 2/2013 | Ohashi | H02K 1/32 310/59 |

FOREIGN PATENT DOCUMENTS

| | | | | |
|---|---|---|---|---|
| CN | 102055283 A | 5/2011 | | |
| CN | 102483054 A | 5/2012 | | |
| DE | 19528090 C1 | 1/1997 | | |
| GB | 724456 | 2/1955 | | |
| GB | 724456 A | 2/1955 | | |
| GB | 2096409 A | * | 10/1982 | ............... H02K 9/19 |
| JP | S50129904 A | 10/1975 | | |
| JP | 54009043 | 1/1979 | | |
| JP | S549043 A | 1/1979 | | |
| JP | 2000503199 | 3/2000 | | |
| JP | 2000503199 A | 3/2000 | | |
| JP | 2011527397 A | 10/2011 | | |
| WO | WO 2011132784 A1 | * | 10/2011 | ............... H02K 1/32 |

OTHER PUBLICATIONS

CN Office Action dated Sep. 2, 2016, for CN application No. 201380059060.4.
"Strahlpumpe"; Wikipedia; pp. 1-6; 2012; DE; Nov. 11, 2012.
JP Final Office Action dated Dec. 19, 2016, for JP patent application No. 2015-541073.
American Heritage: "duct" (n.d.) American Heritage® Dictionary of the English Language, Fifth Edition. (2011 ). Retrieved Jan. 14, 2017, from http://www.thefreedictionary.com/duct; 2011 (previously cited).
JP Notice of Allowance dated Jun. 19, 2017, for JP patent application No. 2015541073.

* cited by examiner

COOLING SYSTEM FOR ELECTRIC GENERATORS

CROSS REFERENCE TO RELATED APPLICATIONS

This application is the US National Stage of International Application No. PCT/EP2013/072240 filed Oct. 24, 2013, and claims the benefit thereof. The International Application claims the benefit of German Application No. DE 102012220559.4 filed Nov. 12, 2012. All of the applications are incorporated by reference herein in their entirety.

FIELD OF INVENTION

The invention relates to a cooling system for electric generators.

BACKGROUND OF INVENTION

Electric generators have been known for some time. Their action is based on the conversion of kinetic energy or mechanical energy into electric energy, wherein as a result of movement of an electric conductor in a magnetic field a voltage is induced in the conductor. The triumph of electrification was only able to be made possible and to enter into our daily routine with the development of electric generators.

For the generation of electric energy, large electric power station generators are used today. On account of power losses during their operation as a result of eddy-current losses, magnetization losses due to hysteresis, or friction losses caused by bearings and seals, etc., considerable heating of the electric generator occurs and has a negative influence on its power efficiency and therefore on its economic efficiency.

For this reason, a power loss occurring in the form of heat has to be dissipated because the electric generator can otherwise overheat. Cooling of electric generators is particularly desirable due to this.

However, the previous concepts for the cooling of electric generators offer still more potential for improvement. For example, power station generators up to an output of 300 MW are cooled by means of a forced cooling system. In the case of electric generators of this performance class this type of cooling reaches a physical limit since an air velocity which is required for the cooling of the electric generator is so high that a cooling effect is neutralized as a result of friction losses of the air in the electric generator. Considerations for improving the cooling effect make very high demands on the geometry of the electric generator. A disadvantage of this method is that parts of the electric generator which for example are located in the middle of the electric generator are insufficiently cooled.

In contrast, most electric generators with an output of from about 300 MW onwards are usually liquid cooled. Liquid cooled electric generators with such a high output no longer have stator windings but require stator bars. A cooling fluid then flows through the stator bars, absorbing or dissipating the lost heat.

In further considerations, attempts were made to install a thermosiphon cooling system in an electric generator. This cooling method, however, has the disadvantage that the way in which a cooling fluid is distributed in the individual stator bars cannot be actively influenced.

SUMMARY OF INVENTION

It is an object of the present invention to provide an electric generator which improves the economic efficiency during operation and the power efficiency of electric generators.

This object is achieved by an electric generator which has at least one inlet and an outlet for at least one hollow duct for receiving a cooling fluid, wherein the hollow duct can be arranged in, or on, a rotor and/or a stator and/or a shaft and/or a housing of the electric generator, and wherein the hollow duct is designed as an evaporator for absorbing heat energy from the electric generator via the cooling fluid. An essential advantage in this case is that electric generators, which are provided with hollow conductors, can be cooled directly with a cooling fluid. This can be implemented in a particularly effective and efficient manner for example in the case of electric generators the conductors or stator bars of which are provided with hollow ducts.

Consequently, the invention provides that a hollow conductor or stator bar or a hollow housing and also a hollow shaft of an electric generator is used as the evaporator of a heat pump. As a result, it is possible in a simple manner to increase the efficiency of an electric drive or of an electric generator. Furthermore, such electric generators can be produced to be more compact.

In an embodiment of the invention, the electric generator is designed for directing the cooling fluid via the outlet of the duct to a compressor for compression which in its turn feeds the cooling fluid to a condenser for heat release, from which the cooling fluid can then be further directed to a restrictor for expansion, and from the restrictor can be fed again via the inlet of the hollow duct—acting as an evaporator—of the electric generator for absorbing heat energy, wherein the compressor is designed for maintaining transfer of the cooling fluid by absorbing mechanical work.

In other words, the electric generator utilizes the characteristics of a compression refrigerating machine. Therefore, the effect of the evaporation heat during a change of the aggregation state from liquid to gaseous is utilized. The cooling fluid, which is moved in a closed cycle, experiences different state of aggregation changes one after the other in the process. During this, the gaseous cooling fluid is first of all compressed by a compressor in this case. From the compressor, the cooling fluid is fed to a condenser, releasing heat. The liquid cooling fluid is then transferred to a restrictor for expansion, wherein its pressure is reduced at the same time. The now expanded cooling fluid is again fed via the inlet of the hollow duct—acting as an evaporator—of the electric generator for absorbing heat energy. The cycle described above can now begin again from the start. The process has to be kept running from the outside by the feed of mechanical work via the compressor.

In this way, the cooling fluid absorbs a heat capacity—in this case via the hollow duct, acting as an evaporator, of the electric generator—at a low temperature level and then releases the heat capacity to the environment by the feed of mechanical work—from the compressor—at a higher temperature level. In this case, the efficiency of the cooling system—acting as a compression refrigerating machine—of the electric generator is increased as temperatures of the environment fall.

In another embodiment of the invention, the electric generator is designed in such a way that the cooling fluid is to be extracted via the outlet of the duct by a jet pump, by a negative pressure being able to created by an accelerated working medium of the jet pump and by the expanding cooling fluid being able to be sucked in via the outlet, and wherein the sucked-in cooling fluid can be fed together with the working medium from the jet pump to a condenser for cooling, from which it can then be fed again via the inlet of the hollow duct to the evaporator. A particular advantage of this embodiment is that there is no requirement for a compressor but only for a comparatively simply constructed pump.

In a further embodiment, the working medium of the jet pump is an ionic liquid. Since ionic liquids have only an exceptionally low vapor pressure, it is possible to achieve a large negative pressure with a jet pump for sucking in the cooling fluid from the hollow duct of the electric generator. This effect is used for evaporating the cooling fluid. During the evaporation of the cooling fluid, heat is extracted from the environment in the process. In this way, the cooling of the electric generator is achieved.

In order to increase the effectiveness of the cooling, the cooling fluid is a readily volatile substance. As a result, cooling can be carried out in a particularly effective and efficient manner.

In a further embodiment, the heat is not released directly to the environment but to an interposed heat transfer medium—being an additional cooling cycle—which can have a lower temperature, like the "environment" of the electric generator which is referred to above. In this case, the higher the temperature difference between the cooling fluid and the interposed heat transfer medium—being the additional cooling cycle—is, the higher the effectiveness of the cooling of the electric generator is.

BRIEF DESCRIPTION OF THE DRAWINGS

In the following text, the invention and exemplary embodiments are explained in more detail with reference to a drawing.

In the drawing.

DETAILED DESCRIPTION OF INVENTION

Figure 1:
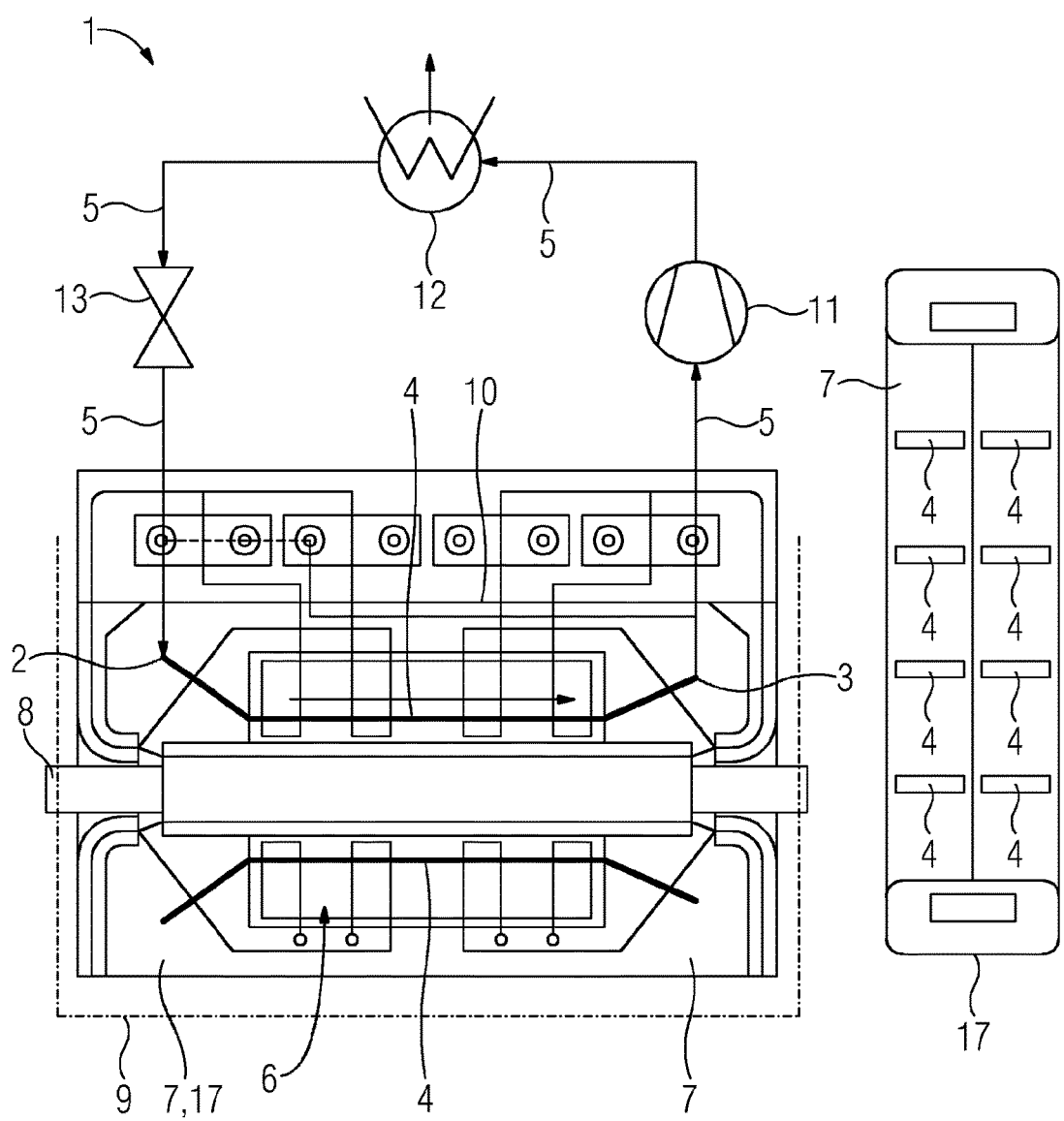
FIG. 1 shows an electric generator with integrated hollow stator bars for cooling, according to an embodiment of the invention.

Shown in FIG. 1 is an electric generator 1 according to an embodiment of the invention. The electric generator 1 in the embodiment shown in FIG. 1 is designed as an electric machine. In this case, the essential components of the electric generator 1 are shown in simplified form. In this case, it concerns a rotor 6, located on a shaft 8, which is rotatably mounted inside a stator 7 with hollow stator bars 17, wherein the individual components are accommodated in a housing 9.

During operation of the electric generator 1 power losses occur and lead to heating of the individual components and as a result reduce the efficiency of the electric generator 1. In order to counteract this, in this embodiment the stator 7, or its stator bars 17, is or are provided with hollow ducts 4 which are suitable for receiving and conducting a cooling fluid 5. For simplification, only a few ducts 4 are shown in FIG. 1 in order to illustrate the principle of operation of a cooling system of the electric generator 1.

In order to enable cooling of the electric generator 1 which is as high and uniform as possible, the electric generator 1 according to a further embodiment of the invention can have hollow ducts 4 in a plurality or in all of the components of the electric generator 1 for receiving the cooling fluid 5—not shown in this case. The hollow duct 4 has an inlet 2 and an outlet 3 through which a cooling fluid 5 is fed to or discharged from the hollow duct 4. In this case, the hollow duct 4 undertakes the function of an evaporator 10 for absorbing heat energy from the electric generator 1 by the cooling fluid 5 contained therein. Via the inlet 2 or the outlet 3, the hollow duct 4, acting as an evaporator 10, is connected to a cycle, the additional components of which complement each other to form a compression refrigerating machine in the depicted embodiment.

Illustrated with the aid of the arrows in FIG. 1 is the direction of a cycle in which the cooling fluid 5 passes through different state of aggregation changes one after the other. In the process, the heated cooling fluid 5 is fed from the electric generator 1 in its hollow duct 4, via the outlet 3, to a compressor 11 which compresses the cooling fluid 5 and transfers it to a condenser 12 in which the cooling fluid 5 is cooled, releasing heat. The cooling fluid 5 is then expanded via a restrictor 13, wherein the cooling fluid 5 is again converted into a gaseous state. In a further step, the cooled fluid 5 is again fed via an inlet 2 to the hollow duct 4, acting as an evaporator 10. The cooling fluid 5 can now again absorb heat energy of the electric generator 1. With this, the cycle described above begins again from the start.

In order to keep the cycle in operation, the feed of mechanical work via the compressor 11 is necessary. In this case, the energy required for the mechanical work is less than the energy produced as a result of the cooling of the electric generator 1. Suitable heavy duty refrigeration plants or compression refrigerating machines have already been proposed as a product. For illustration purposes, it can be assumed that a plurality of electric generators 1 altogether produce 1 GW of electrical output in a power station. With an efficiency of about 98%, the power loss of the electric generator 1 corresponds to about 20 MW. A refrigeration plant can generate for example up to 35 MW of refrigerating capacity. In order to generate 20 MW of refrigerating capacity, this plant requires about 2.5 MW of electrical output which means exactly 0.25% of efficiency losses. Against this is a saving of compressor output/pump output for cooling by the cooling fluid 5 and the efficiency increase by reducing the ohmic resistance of the stator bars 17 and also a reduction of the temperature of the stator 7 itself. Depending on the type of construction, the influence is different. According to this, either the efficiency of the electric generator 1 can be left the same, wherein more output would be required for this with the same construction space, or the same output can be produced with increased efficiency. An accurate figure for the efficiency gain cannot be specified here since this depends on the type of construction and operating point of the generator.

Figure 2:
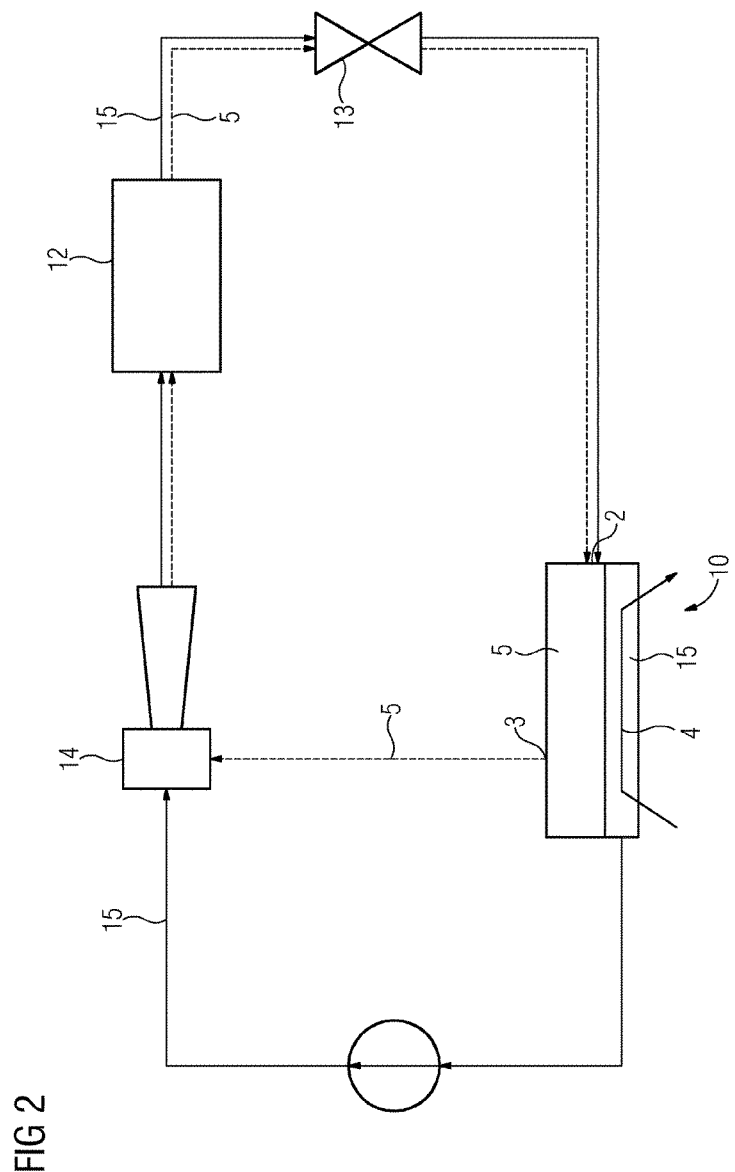
FIG. 2 shows a schematic diagram of a jet pump for the cooling of an electric generator and its implementation according to an embodiment of the invention.

FIG. 2 shows a further embodiment of the invention, wherein in the case represented therein the cooling of the cooling fluid 5 is carried out by a jet pump 14. For simplification purposes, only the hollow duct 4 which acts as an evaporator 10 for absorbing heat energy from the electric generator 1 by a cooling fluid 5 is shown. In this case, the jet pump 14 is a pump in which the pump action is created by a further fluid jet, in this case a working medium 15, which sucks in, accelerates and compresses/pumps another medium—in this case the cooling fluid 5—by impulse exchange. The jet pump 14 is of very simple construction and for that reason is particularly robust, low in maintenance and versatile in its application. In the present embodiment, an ionic liquid is used as the working medium 15. Ionic liquids have an exceptionally low vapor pressure and as a result enable the jet pump 14 to achieve particularly low pressures—in this case suction pressures. The working medium 15 is impelled at very high velocity by the jet pump 14, wherein a negative pressure is created in the jet pump and sucks out the heated cooling fluid 5 in the hollow duct 4, acting as an evaporator 10, from said hollow duct 4 of the electric generator 1 and feeds it together with the working medium 15 to a condenser 12. As a result of the cooling fluid 5 being a readily volatile substance this is sucked out of the evaporator 10. The heat energy which is required for evaporation is extracted from the cooling fluid 5 in the evaporator 10, wherein the cooling fluid 5 or the electric generator 1 is cooled.

In the condenser 12, the vapor is liquefied and the ensuing mixture comprising cooling fluid 5 and working medium 15 is then expanded via a restrictor 13. The mixture is then fed again to the evaporator 10 via the inlet 2. In the evaporator 10, the separation of the cooling fluid 5 from the working medium 15 is then carried out again by evaporation. The cycle then begins again from the start. This type of cooling does not require a compressor but only a comparatively simple pump or jet pump 14. As a result, the embodiment shown in FIG. 2 allows higher cost savings during operation.

The solution according to previously described exemplary embodiments utilizes the hollow stator bars 17 directly as an evaporator. Use can alternatively or additionally be made of refrigerating plants for the cooling of the electric generator 1, in which an intermediate cycle with a further heat transfer medium is interposed for cooling the cooling fluid 5—not shown here. In additional alternative exemplary embodiments, the additional individual elements of the electric generator can be cooled individually or collectively.

The invention claimed is:

1. An electric generator, comprising:
a housing; a rotor; a rotor shaft; and a stator or a stator bar;
plural hollow ducts configured to form a parallel circuit within a cooling circuit, each hollow duct of the plural hollow ducts being configured to convey a discrete flow of cooling fluid into and out of at least one of the housing, the rotor, the rotor shaft, and the stator or the stator bar, wherein the plural hollow ducts are configured to operate as an evaporator;
a motive unit configured to receive the cooling fluid from the plural hollow ducts, wherein the motive unit comprises a jet pump;
a condenser configured to receive the cooling fluid from the motive unit;
a restrictor configured to receive the cooling fluid from the condenser and deliver the cooling fluid to the plural hollow ducts; and
a jet pump circuit comprising the jet pump and a working medium, wherein the jet pump is disposed between the plural hollow ducts and the condenser and is configured to accelerate the working medium to draw the cooling fluid from the plural hollow ducts and deliver a mixture of the cooling fluid and the working medium to the condenser,
wherein the jet pump circuit is configured to deliver the working medium from the plural hollow ducts, then to the jet pump, then to the condenser, then to the restrictor, and then to the plural hollow ducts, and
wherein the jet pump circuit is configured to separate the working medium from the cooling fluid in the plural hollow ducts when the cooling fluid evaporates and to deliver the working medium to the jet pump.

2. The electric generator of claim 1, wherein the working medium comprises an ionic liquid.

3. The electric generator of claim 1, wherein each hollow duct of the plural hollow ducts being configured to convey the discrete flow of cooling fluid into and out of out of at least one of the stator and the stator bar.

4. An electric generator, comprising:
a housing; a rotor; a rotor shaft; and a stator or a stator bar;
a hollow duct configured to convey a cooling fluid into and out of at least one of the rotor, the rotor shaft, and the stator or the stator bar, wherein the hollow duct is configured to operate as an evaporator;
a motive unit configured to receive the cooling fluid from the hollow duct, wherein the motive unit comprises a jet pump;
a condenser configured to receive the cooling fluid from the motive unit;
a restrictor configured to receive the cooling fluid from the condenser and deliver the cooling fluid to the hollow duct; and
a jet pump circuit comprising the jet pump and a working medium, wherein the jet pump is disposed between the hollow duct and the condenser and is configured to accelerate the working medium to draw the cooling fluid from the hollow duct and deliver a mixture of the cooling fluid and the working medium to the condenser,
wherein the jet pump circuit is configured to deliver the working medium from the hollow duct, then to the jet pump, then to the condenser, then to the restrictor, and then to the hollow duct, and
wherein the jet pump circuit is configured to separate the working medium from the cooling fluid in the hollow duct when the cooling fluid evaporates and to deliver the working medium to the jet pump.

5. The electric generator of claim 4, wherein the working medium comprises an ionic liquid.

6. The electric generator of claim 4, wherein the cooling fluid is a readily volatile substance.

7. The electric generator of claim 4, wherein the cooling fluid is cooled directly or via an additional cooling cycle.

* * * * *